(12) United States Patent
Miikkulainen et al.

(10) Patent No.: US 11,530,097 B2
(45) Date of Patent: Dec. 20, 2022

(54) PARTITION WALL OF A STORAGE

(71) Applicant: Cimcorp Oy, Ulvila (FI)

(72) Inventors: Kari Miikkulainen, Pori (FI); Jarno Honkanen, Pori (FI)

(73) Assignee: Cimcorp Oy, Ulvila (FI)

( * ) Notice: Subject to any disclaimer, the term of this patent is extended or adjusted under 35 U.S.C. 154(b) by 0 days.

(21) Appl. No.: 17/749,753

(22) Filed: May 20, 2022

(65) Prior Publication Data

US 2022/0371831 A1    Nov. 24, 2022

(30) Foreign Application Priority Data

May 21, 2021 (FI) ..................................... 20215607

(51) Int. Cl.
| | | |
|---|---|---|
| *B65G 47/22* | (2006.01) | |
| *B25J 9/02* | (2006.01) | |
| *B65G 61/00* | (2006.01) | |

(52) U.S. Cl.
CPC .................. *B65G 47/22* (2013.01)

(58) Field of Classification Search
None
See application file for complete search history.

(56) References Cited

U.S. PATENT DOCUMENTS

| | | | | |
|---|---|---|---|---|
| 3,782,758 A | * | 1/1974 | Williamson, III | ........ B60P 7/14 160/370.1 |
| 5,407,316 A | * | 4/1995 | Coatta | .................. B65G 63/004 414/277 |
| 6,981,828 B2 | * | 1/2006 | Davies | .................... B60P 7/135 410/144 |
| 8,029,710 B2 | * | 10/2011 | Khoshnevis | ....... B23Q 11/0014 212/312 |
| 8,100,252 B2 | * | 1/2012 | Fourney | ................. B65G 47/22 198/457.06 |
| 9,949,419 B2 | * | 4/2018 | Sano | ........................ B25J 9/026 |
| 2005/0074310 A1 | | 4/2005 | Davies | |
| 2017/0362031 A1 | | 12/2017 | Solignac | |

FOREIGN PATENT DOCUMENTS

| | | |
|---|---|---|
| DE | 202018002079 A1 | 9/2018 |
| KR | 20160090490 A | 8/2016 |

OTHER PUBLICATIONS

Search report of corresponding Finnish application 20215607, dated Dec. 13, 2021, 1p.
Notice of Allowance issued by Finnish Patent and Registration office and English Translation thereof, dated Dec. 13, 2021, 8 p.
Allowable Specification and Abstract issued by Finnish Patent and Registration office and English Translation thereof, 26 pages.
Search report from European Patent Office for corresponding application 22173673.9; dated Sep. 9, 2022, 5 pages.

* cited by examiner

*Primary Examiner* — Kavel Singh
(74) *Attorney, Agent, or Firm* — Meunier Carlin & Curfman LLC

(57) ABSTRACT

A partition wall arrangement of a storage according to the invention comprises a wall element with a framework and a liftable wall element. The framework comprises a horizontal upper element and side element. The liftable wall element is arranged between the side elements and fastened to the upper element. The partition wall arrangement further comprises a horizontal beam in connection with both side elements. The beams are parallel to each other and transverse to the wall element.

14 Claims, 5 Drawing Sheets

PARTITION WALL OF A STORAGE

PRIORITY

This application claims priority of Finnish national application number 20215607 filed on May 21, 2021, the contents of which is incorporated herein by reference.

FIELD OF THE INVENTION

The invention relates to a partition wall of a storage. In particular, the invention relates to storages equipped with a gantry robot.

BACKGROUND OF INVENTION

Storage spaces are used for storing a variety of products. The products are transferred to and from the storage area of the storage by, for example, a gantry robot. The gantry robot comprises a gripper which picks up a product, or products, from the storage by gripping it and lifting it up. The product/products lifted up are transferred by the gantry robot to the edge of the storage area, for example to a conveyor which carries them further forward. In a corresponding way, a robot at the edge of the storage area may transfer products for storage. The gantry robot fetches the products to be stored and transfers them to a desired place in the storage area.

The product or products may be contained in crates or boxes. In this way, particularly products of smaller size can be stored more easily. For example, it is easier to move and store various beverage bottles or packages by using crates.

Some products require that the storage temperature is relatively low so that the products remain in good condition during the storage. Foodstuffs, such as milk products, are such products. On the other hand, some products also keep well at higher temperatures, such as at normal room temperature. For example, canned products and various preserved foods are such products. If the storage is used for storing products having different storage temperature requirements, such as milk products and foodstuffs which can be kept at normal room temperature, the whole storage space has to be cooled. Cooling increases the energy consumption and thereby the storage costs.

KR 20160090490 discloses a partition wall arrangement for an industrial working space, having a wall element and a framework. The framework comprises a horizontal upper element and side elements. The wall element is between the side elements. US 2005074310 discloses a partition wall arrangement for a container, in which the location of the wall element can be adjusted.

In many cases, the storage space is divided by a partition wall, whereby products requiring a lower storage temperature are placed on the opposite side of the partition wall with respect to products which keep well at higher temperatures. Consequently, the storage is space is divided into, for example, two compartments by a partition wall built in the storage for this purpose. The constructed partition wall requires that a separate movable gantry robot gripper is provided on each side of the partition wall, for bringing products in and taking them out of the storage. The utilization of the storage space is not always very good, if changes take place in the quantities of the products requiring different storage temperatures.

SUMMARY OF THE INVENTION

It is an aim of the invention to provide a partition wall of a storage to enable better utilization of the storage space in the storage and the movement of a gantry robot gripper in the entire storage space of the storage, on both sides of the partition wall. This is achieved in the way presented in the independent claim. The dependent claims describe various embodiments of the invention.

The partition wall arrangement of a storage according to the invention comprises a wall element with a framework and a wall element that can be lifted up. The framework comprises a horizontal upper element and side elements. The liftable wall element is arranged between the side elements and fastened to the upper element. The partition wall arrangement further comprises a horizontal beam in connection with both side elements. The beams are parallel to each other and transverse to the wall element.

The side elements are supported at their central section to the beams so that the wall element is movable along the beams. Both side elements comprise a turnable mechanism which can be turned to a transfer position and a holding position. In the transfer position, the wall element is arranged to be moved by a gantry robot, and in the holding position, in which the wall element is lifted up, the partition element is arranged to allow the movement of the gantry robot on both sides of the partition wall arrangement.

BRIEF DESCRIPTION OF THE FIGURES

In the following, the invention will be described in more detail with reference to the appended figures, in which.

DESCRIPTION OF THE INVENTION

Figure 1:
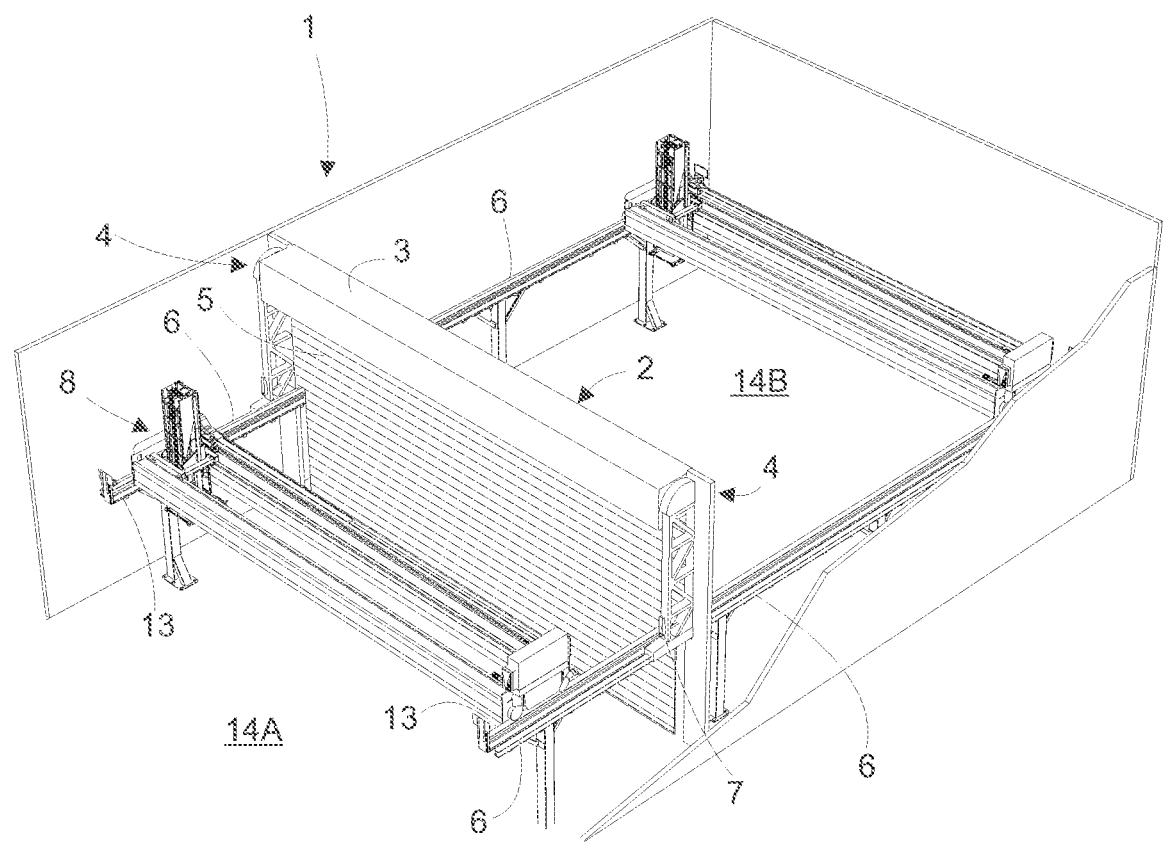
FIG. 1 shows an example of a partition wall for a storage according to the invention.

FIG. 1 shows an example of a partition wall arrangement according to the invention. According to the invention, the partition wall arrangement 1 for a storage comprises a wall element 2 with a framework and a liftable wall element 5. The framework comprises a horizontal upper element 3 and side elements 4. The liftable wall element 5 is arranged between the side elements 4 and fastened to the upper element 3. The partition wall arrangement further comprises a horizontal beam 6 in connection with both side elements. The beams are parallel to each other and transverse to the wall element 2.

At their central section 4A, the side elements are supported to the beams so that the wall element 2 is movable along the beams 6. Both side elements are equipped with a turnable mechanism 7 which can be turned to a transfer position and a holding position. In the transfer position, the wall element 2 is arranged to be moved by a gantry robot 8, and in the holding position, the wall element being lifted up, the partition wall arrangement is arranged to allow the movement of the gantry robot on both sides of the partition wall arrangement.

Figure 2:
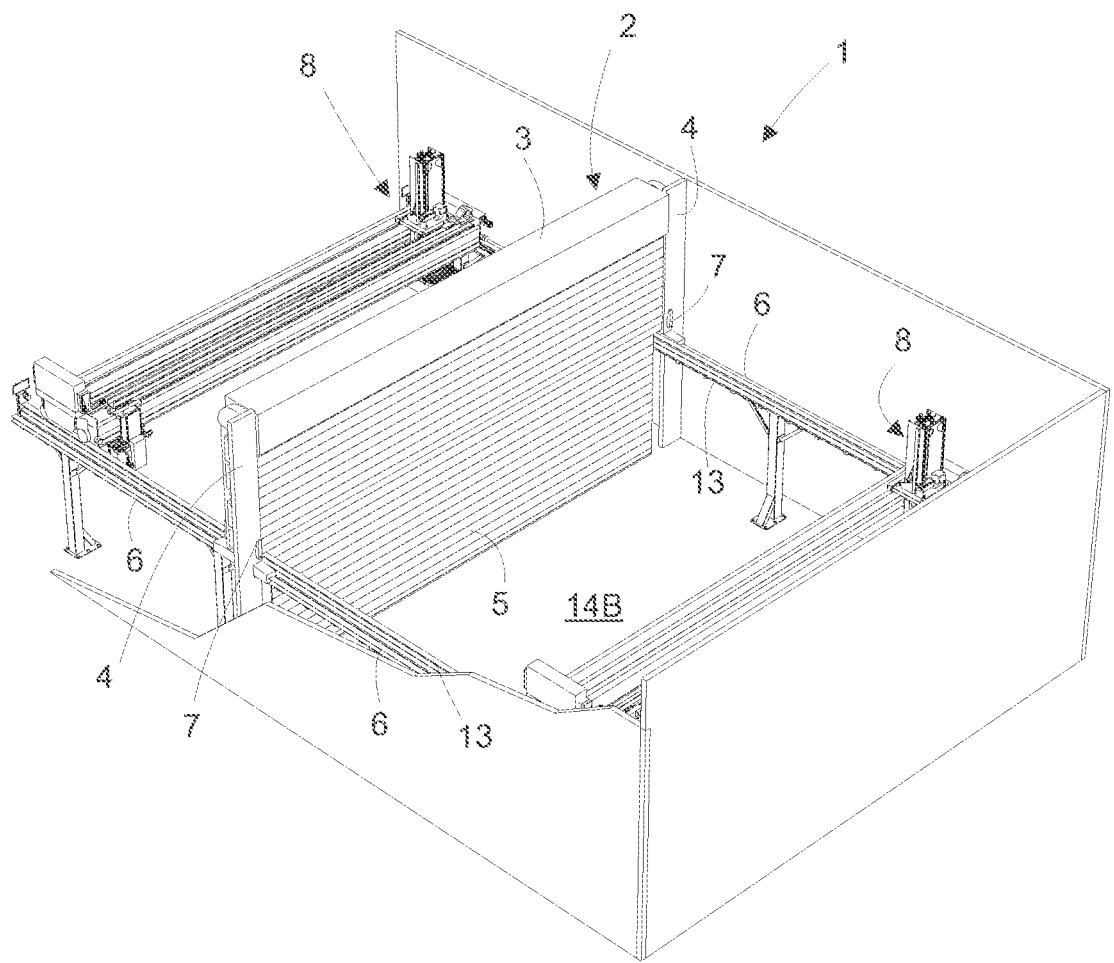
FIG. 2 shows an example of a partition wall for a storage according to the invention, seen from another angle.
Figure 3:
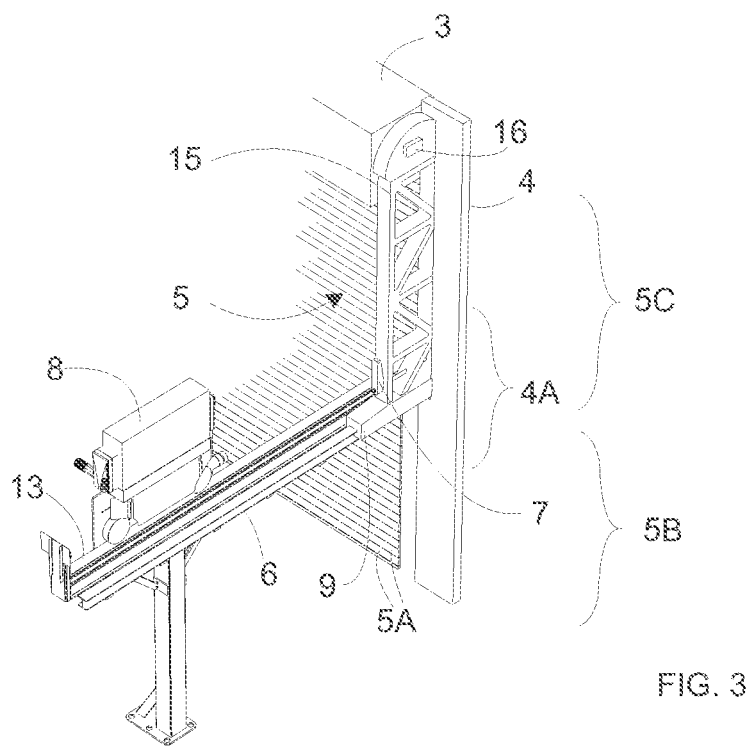
FIG. 3 shows a more detailed example of partition structures in a storage according to the invention.
Figure 4:
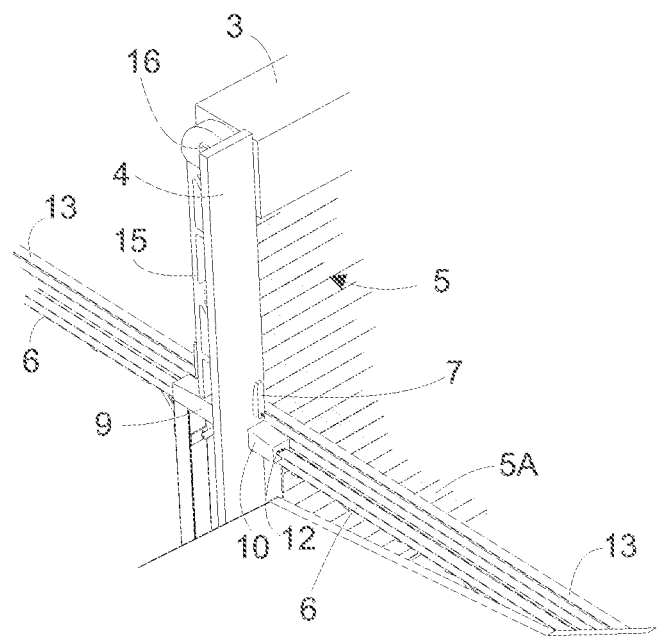
FIG. 4 shows a more detailed example of partition structures in a storage according to the invention, seen from another angle.
Figure 5:
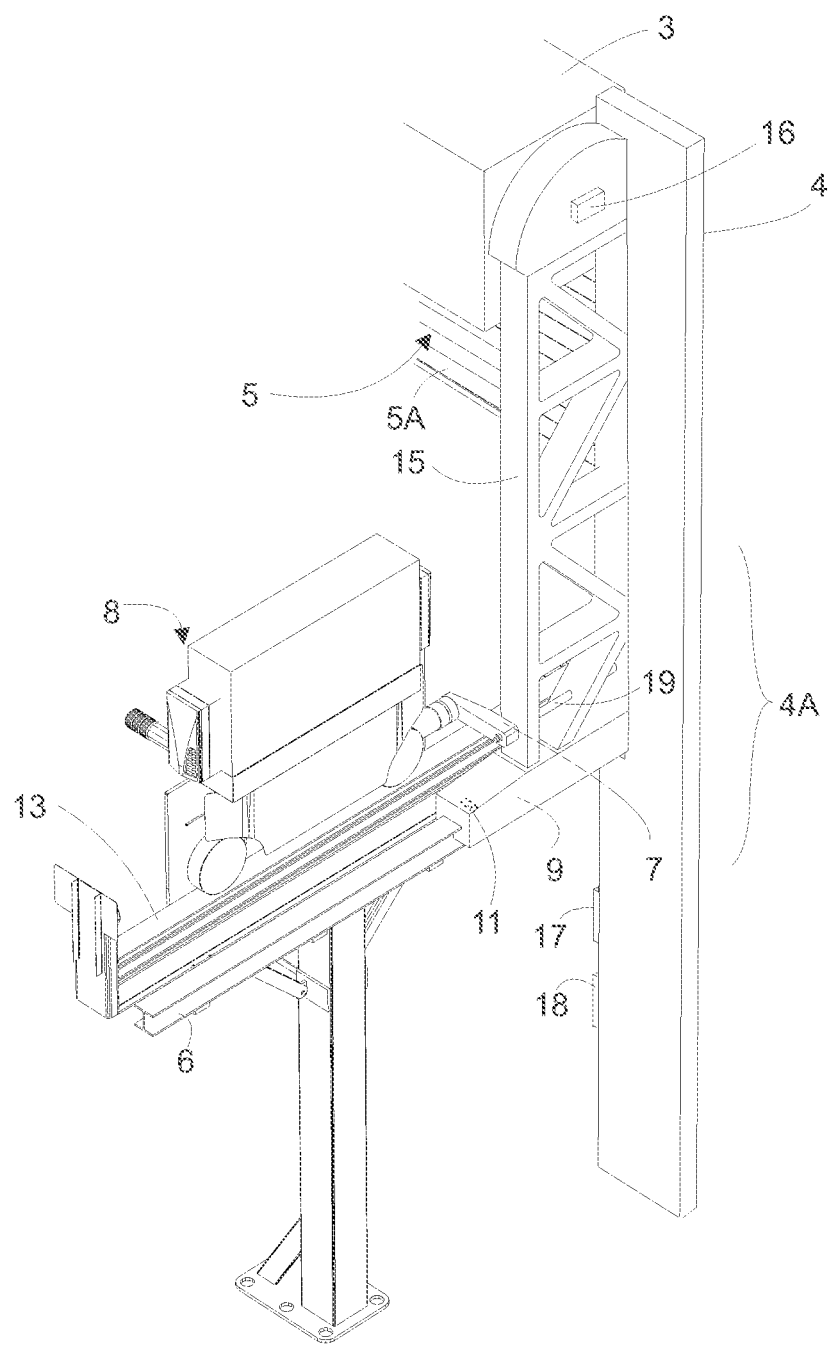
FIG. 5 shows an example of a partition wall for a storage according to the invention in a situation in which it can be moved.

FIG. 2 shows the partition wall arrangement according to the invention from another angle. As can be seen in the figures, the wall element can be moved to a desired location along the beams 6. In this way, the storage space can be divided as desired. FIGS. 3, 4 and 5 show the structures of the partition wall arrangement in more detail. FIG. 5 shows the transfer position of the turnable mechanism 7. FIGS. 3 and 4 show the holding position. FIGS. 3, 4 and 5 do not show all the parts, as can be seen. The illustrated figures are schematic so that real storages, devices and other structures differ from the illustrated figures to at least some extent.

Both side elements 4 comprise a supporting protrusion 9, 10 on both sides of the side element. The supporting protrusions are arranged to rest on the beam 6, for supporting the side element to the beam. The supporting protrusions 9, 10 may have an equal length on both sides of the wall element 2, but they may have different lengths, as shown in the figures. A supporting protrusion 9, 10 may comprise at least one roll 11 which is against the beam. In a corresponding way, a slicing surface 12 may be used, which is against the beam. FIG. 5 shows schematically a roll which may thus be provided in each supporting protrusion 9, 10. FIG. 4 illustrates schematically a sliding surface which may thus be provided on each supporting protrusion. The supporting protrusions thus contribute to the movement of the wall element 2 and also prevent swinging and tilting of the wall element.

The beams 6 of the partition wall arrangement are arranged next to the side beams 13 for the gantry robot 8. The structure of the gantry robot 8 is known as such. As can be seen from the figures, the gantry robot comprises a gantry which is movable along the side beams 13 to a desired location in the storage. The beams 6 can be fastened to the side beams 13 for the gantry robot. The side beams 13 are supported by columns known as such. The gantry comprises a transfer unit with a gripper. By means of the gripper, the transfer unit picks up a desired product or, for example, a crate or crates from the storage, and also places the product/crate to be stored in a desired location in the storage. The transfer unit is thus arranged to move along the gantry.

As can be seen from the figures, the side elements 4 of the partition wall arrangement 1 are arranged to be outside the side beams 13 for the gantry robot, seen from the storage area 14A, 14B. When the liftable wall element 5 of the partition wall arrangement is lifted up and the turnable mechanism 7 is in the transfer position, the gantry robot can be moved from one side of the partition wall arrangement to another, and vice versa, within the storage area 14A, 14B. Both side elements are equipped with a turnable mechanism 7 which can be turned to a transfer position and a holding position.

Consequently, the whole storage area can be divided into, for example, two compartments 14A, 14B, by using one partition wall arrangement according to the invention. The partition of the whole storage area 14A, 14B can be changed as desired, if changes take place in the quantities of the products to be stored. For example, the demand for products requiring a low storage temperature may decrease, whereby less storage space is needed. In such a case, the wall element 2 of the partition wall arrangement can be moved in such a way that the colder section (to be cooled, for example) becomes smaller. Thus, the storage area to be cooled can be adapted to the need.

The horizontal length of the lower half 5B of the liftable wall element is smaller than the horizontal length of the upper half 5C of the liftable wall element. Thus, the liftable wall element does not hit the side beams 13 for the gantry robot.

Both side elements may comprise a supporting structure 15 on one side of the side element, between the upper end of the side element and the supporting protrusion. In this way, the structure becomes sturdier. Supporting structures may be provided on both sides of the side elements 4 as well.

Preferably, the upper part 3 of the framework is arranged close to the ceiling structure of the storage. In this way, heat transfer from one side to the other can be reduced. Furthermore, it is possible to take into account fixtures fastened to the ceiling structure, such as light fixtures and air ducts, so that the partition wall arrangement will not hit them nor the ceiling structure. When gaps between the ceiling structures, walls and the gantry robot system, as well as the movable partition wall arrangement 1 of the storage are relatively small compared with the total area of the wall element 2, a desired situation is achieved in which the temperature of the storage area on one side of the partition wall can be maintained, for example, lower than the temperature of the storage area on the opposite side of the wall element.

In the example of the figures, the upper part 3 of the framework comprises a housing. The housing is placed against the liftable wall element 5 when the latter is lifted up and retracted. The liftable wall element consists of, for example, slats 5A, which are arranged to fold up with respect to each other. The liftable wall element may also be implemented in another way. It may consist of, for example, a material that can be rolled up, such as strong fabric, whereby the liftable wall element can be rolled up into the upper part 3 of the framework. FIG. 5 shows a situation in which the wall element is almost entirely lifted up and retracted into the housing of the upper part, and the turnable mechanism 7 is in the transfer position. In this case, the gantry robot 8 hits the turnable mechanism and can push the wall element to a desired location. The wall element does not necessarily need to be lifted up for moving the wall element, but it may be lifted up. The wall element is lifted up for moving the gantry robot 8 to the other side of the wall element 2.

The partition wall arrangement comprises an electric motor 16 for lifting and lowering the liftable wall element 6. The control of the electric motor can be arranged in a suitable location, for example by using a control unit 17. Also, the turning mechanism 7 of the partition wall arrangement may be configured to be operated by electronic control 18 or by manual control. In the example of the figures, the turning mechanism consists of a pivoted lever which can thus be pivoted electronically by an electric motor or manually. The pivoted lever is connected to the electronic control/electric motor or a manual device (such as a pivoted shaft with a turning handle) by means of a transmission mechanism 19.

Figure 6:
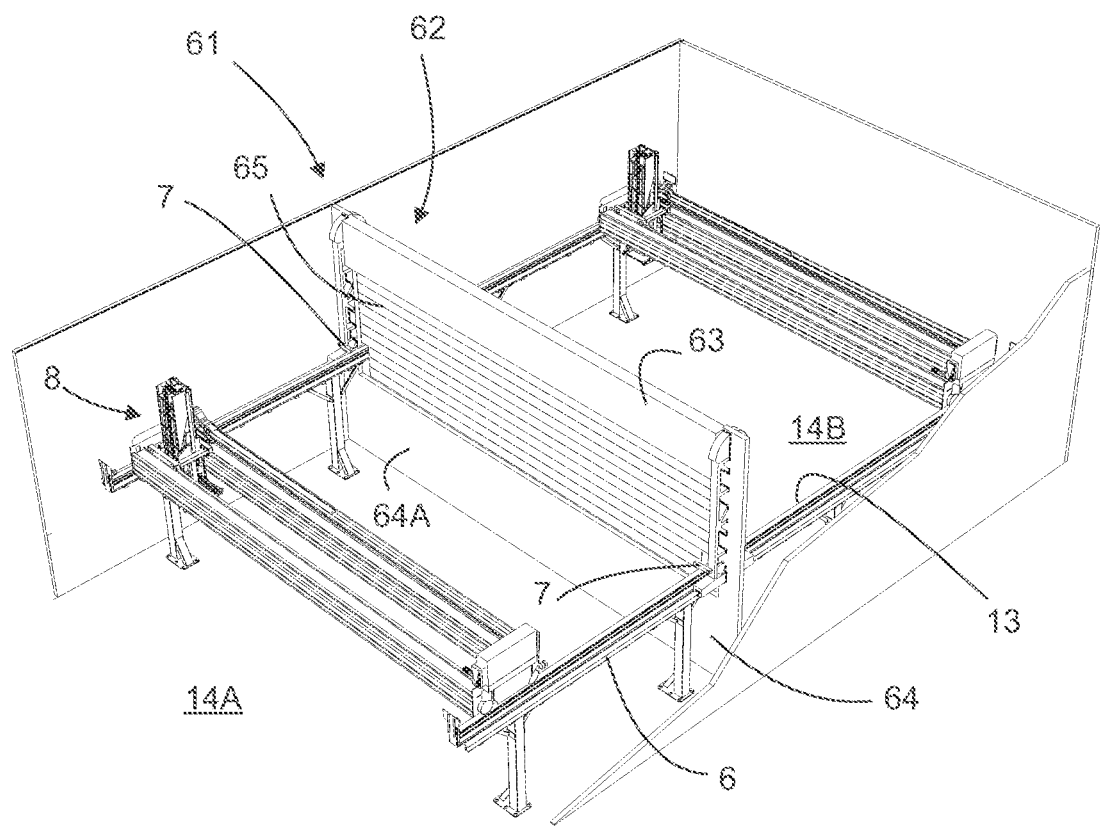
FIG. 6 shows another example of a partition wall for a storage according to the invention.

The above examples present embodiments in which the liftable wall element extends close to the floor of the storage when lowered down. However, the partition wall arrangement according to the invention may also be implemented in another way. FIG. 6 shows another possible embodiment. The partition wall arrangement 61 for a storage shown in FIG. 6 comprises a solid movable wall section 64A. Thus, the liftable wall element 65 in the framework 63, 64 of the wall element 62 is configured to extend close to the lower side of the beams 6, and the side elements 64 are connected to each other at the lower parts of the side elements, forming a solid movable wall section 64A below the beams. It is true that in the solution of FIG. 6, it is also possible that the liftable wall element 65 extends down close to the floor of the storage, but this increases the manufacturing costs of the structure.

It can be seen from FIG. 6 that the upper part 63 of the framework may be narrower/smaller, because the liftable wall element 65 is smaller in size. In the height direction, the solid wall section 64A extends from below the beams 6 down to the vicinity of the floor level of the storage. The partition wall arrangement of FIG. 6 is movable in the same way as the embodiments of FIGS. 1 to 5. Furthermore, the embodiment of FIG. 6 may comprise the same parts and features as have been described above.

The invention provides a partition wall for a storage, enabling better utilization of the storage space of the storage and the movement of the gantry robot gripper in the whole storage area of the storage, on both sides of the partition wall. Energy costs can be reduced when, for example, the storage space to be cooled can be dimensioned according to the need.

Although it is cost efficient to apply only one gantry robot 8 in the whole storage area 14A, 14B, which robot can move on both sides of the partition wall of the storage when the liftable wall element 5, 65 is up, it is also possible to apply more gantry robots. The figures show one gantry robot on each side of the partition wall of the storage. However, it is also possible to provide one or more gantry robots for each compartment (such as 14A) of the storage. In any case, the partition wall of the storage can be moved to a desired location, irrespective of the number of gantry robots.

The installation accessory according to the invention may be implemented in a variety of ways, as can be seen from the description above. Consequently, the invention is not limited to the examples presented in this description, but it may be implemented in various ways within the scope of the independent claim.

What is claimed is:

1. A partition wall arrangement of a storage, comprising a wall element with a framework, the framework comprising a horizontal upper element and side elements, and the wall element being between the side elements and fastened to the upper element, the partition wall arrangement further comprising a horizontal beam in connection with both side elements, the beams being parallel to each other and transverse to the wall element, wherein the wall element is a liftable wall element, and
   the side elements being supported at their central section to the beams so that the wall element is movable along the beams,
   both side elements being provided with a turnable mechanism which can be turned to a transfer position and a holding position,
   in which transfer position the wall element is arranged to be movable by a gantry robot, and
   in which holding position, the liftable wall element being lifted up, the partition wall arrangement is arranged to allow the movement of the gantry robot on both sides of the partition wall arrangement.

2. The partition wall arrangement of a storage according to claim 1, wherein the turnable mechanism is arranged to be operated by electronic control or manual control.

3. The partition wall arrangement of a storage according to claim 1, wherein both side elements comprise a supporting protrusion on each side of the side element, the supporting protrusions being arranged to rest on the beam, for supporting the side element to the beam.

4. The partition wall arrangement of a storage according to claim 3, wherein each supporting protrusion comprises at least one roller or a sliding surface being against the beam.

5. The partition wall arrangement of a storage according to claim 4, wherein the beams (6) are arranged next to the side beams for the gantry robot.

6. The partition wall arrangement of a storage according to claim 5, wherein the side elements (4) are arranged outside the side beams for the gantry robot, seen from the storage area.

7. The partition wall arrangement of a storage according to claim 1, wherein the horizontal length of the lower half of the liftable wall element is smaller than the horizontal length of the upper half of the liftable wall element.

8. The partition wall arrangement of a storage according to claim 3, wherein both side elements comprise a supporting structure on one side of the side element, between the upper end of the side element and the supporting protrusion.

9. The partition wall arrangement of a storage according to claim 1, wherein the upper part (3) of the framework is arranged close to the ceiling structure of the storage.

10. The partition wall arrangement of a storage according to claim 1, wherein the upper part of the framework comprises a housing.

11. The partition wall arrangement of a storage according to claim 1, further comprising an electric motor to lift and lower the liftable wall element.

12. The partition wall arrangement of a storage according to claim 1, wherein the liftable wall element consists of panels which are configured to be folded with respect to each other.

13. The partition wall arrangement of a storage according to claim 1, wherein the beams are fastened to the side beams for the gantry robot.

14. The partition wall arrangement of a storage according to claim 1, wherein the liftable wall element of the framework of the wall element is configured to extend close to the lower side of the beams, and the side elements are connected to each other at the lower parts of the side elements, forming a solid movable wall section below the beams.

* * * * *